United States Patent [19]

Hoshide

[11] Patent Number: 5,012,687
[45] Date of Patent: May 7, 1991

[54] BALL SCREW

[75] Inventor: Kaoru Hoshide, Yokohama, Japan

[73] Assignee: THK Co., Ltd., Tokyo, Japan

[21] Appl. No.: 432,939

[22] Filed: Nov. 7, 1989

[30] Foreign Application Priority Data

Nov. 16, 1988 [JP] Japan .................. 63-287782

[51] Int. Cl.$^5$ ............................... F16H 25/22
[52] U.S. Cl. ................... 74/89.15; 74/424.8 R; 74/459
[58] Field of Search ........ 74/89.15, 424.8 R, 424.8 A, 74/459

[56] References Cited

U.S. PATENT DOCUMENTS

| | | | |
|---|---|---|---|
| 3,670,583 | 6/1972 | Leming | 74/89.15 |
| 3,785,316 | 1/1974 | Leming et al. | 74/89.15 |
| 4,649,016 | 3/1987 | Hardin, Jr. | 74/89.15 |

FOREIGN PATENT DOCUMENTS

| | | |
|---|---|---|
| 0252700 | 1/1988 | European Pat. Off. .|
| 0281491 | 9/1988 | European Pat. Off. .|
| 60-227054 | 11/1985 | Japan . |
| 60-256668 | 12/1985 | Japan . |
| 60-263764 | 12/1985 | Japan . |
| 493578 | 2/1976 | U.S.S.R. .................. 74/459 |
| 562932 | 7/1944 | United Kingdom ........ 74/459 |

Primary Examiner—Leslie A. Braun
Assistant Examiner—Scott Anchell
Attorney, Agent, or Firm—Armstrong, Mikaido, Marmelstein, Kubovcik & Murray

[57] ABSTRACT

A ball screw composed of a screw shaft constantly supported on struts at plural parts and a nut movable over an entire length of the shaft by rotations thereof. The nut moves with a high accuracy, and the durability is improved with a simple structure by preventing screw shaft deflections due to elongation thereof.

2 Claims, 6 Drawing Sheets

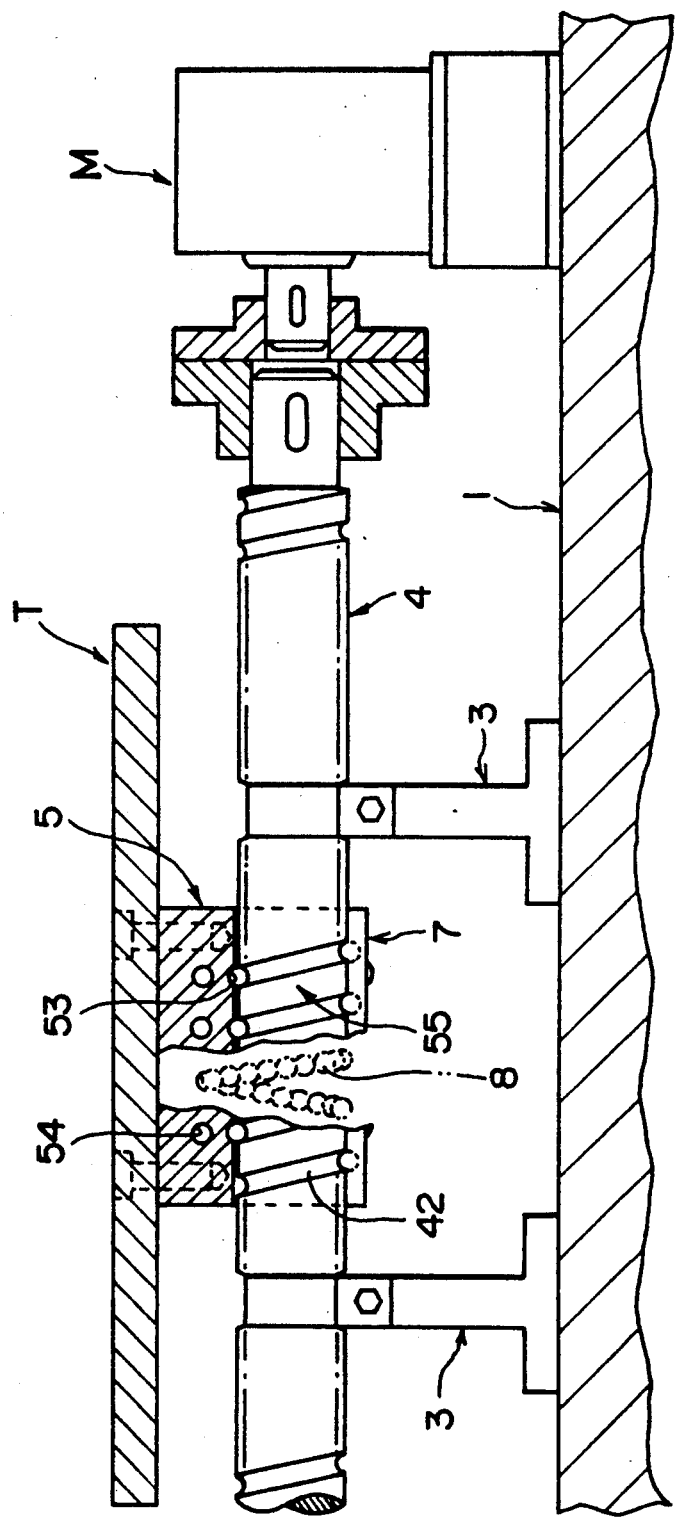

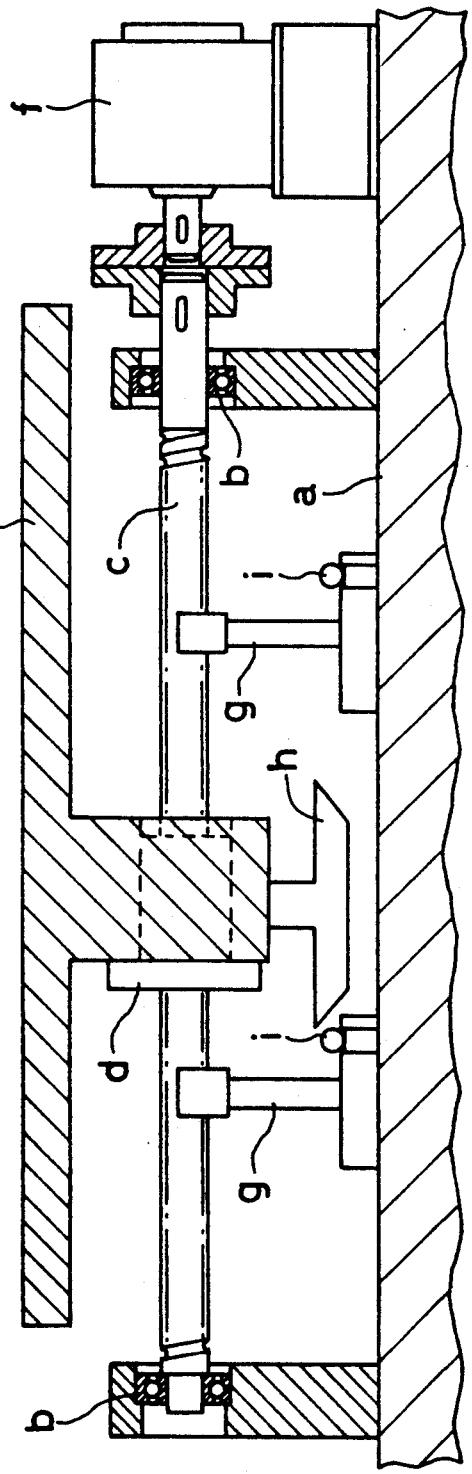
PRIOR ART FIG. 7
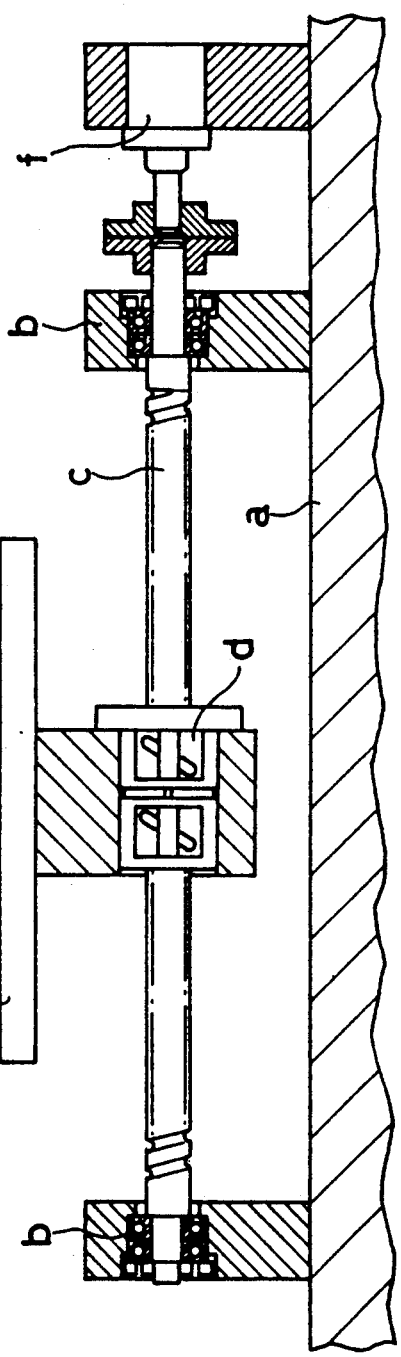
PRIOR ART FIG. 8

BALL SCREW

FIELD OF THE INVENTION AND RELATED ART STATEMENT

The present invention is generally directed to a ball screw in which rotary and rectilinear motions are interchangeable, and more particularly, to an improvement of a ball screw having an elongate screw shaft.

Generally, a ball screw is an oft-used device for converting power produced in the form of rotary motions by a motor or the like into rectilinear motions as seen in feeding a workpiece of a machine tool like an NC machine or in moving a table in an automatic production line.

The ball screw is typically equipped with: a screw shaft an outer periphery of which is chased with helical rolling grooves; a nut having an endless circulatory path consisting of a load region formed with load rolling grooves standing vis-a-vis with the helical rolling grooves and a non-load region for connecting both ends of this load region to permit the communication with each other, the nut moving on the screw shaft in accordance with rotations of the screw shaft; and a multiplicity of balls which bear loads between the load rolling grooves of the nut and the rolling grooves of the screw shaft while circulating in the endless circulatory path. Typical usage of the ball screw is such that, as illustrated in FIG. 8, both ends of a screw shaft c is rotatably supported on rotary bearings b mounted on a fixing unit a such as a bed or the like, while a nut d is linked to a workpiece or a table e, and rotary motions of the screw shaft c are, when power of a motor f is conveyed thereto, fetched as rectilinear motions for the workpiece or the table e.

When feeding the workpiece or the table by employing the thus constructed ball screw, and if a moving distance is set large, the nut is also set to exhibit a large moving distance. It is therefore required that the screw shaft be elongated in length. The screw shaft is, however, retained at two points of its axial ends, and it follows that deflections are caused due to its dead weight in the case of elongating the screw shaft. For this reason, there arise some problems peculiar to the elongation of the screw shaft.

(1) The workpiece or the table engaging with the nut is so supported as to be movable only in a moving direction of the nut by a rectilinear guide mechanism provided separately from the ball screw, and takes such a structure that no radial load is exerted on the ball screw. Based on this structure, when the screw shaft deflects, the screw shaft acts to apply the radial loads on the nut, with the result that a life-span of the ball screw diminishes because of an inside load caused within the nut.

(2) When the screw shaft rotates, repetitive loads in a deflective direction act on the ends of the shaft, thereby creating problems of reducing the life-span thereof due to metal fatigues and causing axial vibrations during the revolutions.

(3) There is produced an error in cumulative lead of the entire screw shaft because of the deflections thereof, so that the nut can not be moved with a high accuracy.

Under such circumstances, it is of much importance to prevent the deflections on the occasion of elongating the screw shaft in terms of improving the accuracy and durability as well, and some technical proposals have been made.

In one of these proposals, there is provided a known ball screw having a structure in which struts g so detachably attached to the screw shaft c as to be vertically movable by an switch operation are disposed at proper spacings beneath the screw shaft c, a guide arm h protruding to and fro in the moving directions works to operate a limit switch i for controlling the attachment or detachment of the struts g to or from the screw shaft c, the struts g separate from the screw shaft c just before the nut d passes through supported parts of the screw shaft c to thereby permit passing of the nut d aside of the supported parts, and the deflections caused by the elongation of the screw shaft c are prevented.

To exemplify another known ball screw, the arrangement thereof is such that a rectilinear guide mechanism is provided on a fixing unit under the screw shaft, and the radial loads due to the deflections of the screw shaft do not act on the nut by retaining the nut from underside with a slide of the rectilinear guide mechanism.

Traits of the former ball screw are as follows. The spacings at which the supporting points of the screw shaft are positioned are reduced, and hence the foregoing problems do not appear outstandingly. The struts are, however, released from the screw shaft when the nut passes through these struts, so that the deflections of the screw shaft can not be prevented over an entire region in the longitudinal direction. The deflections are, though small, always present in the moving parts of the nut, as a result of which the above-mentioned problems can not completely be eliminated. Besides, this type of ball screw involves the use of an intricate mechanism in which the struts are attached to and detached from the screw shaft concomitantly with the switch operation. This presents additional drawbacks of requiring much labor for assembly and being costly.

The latter ball screw exhibits the following features. Since the nut is retained from anti-radial directions as well as from the radial directions, there appears no such problem that the radial loads caused by the deflections of the screw shaft are not applied on the nut. In the screw shaft, however, portions other than the moving parts of the nut undergo the deflections, and problems remain unsolved wherein repetitive loads act on the ends of the screw shaft and an error of cumulative lead takes place.

OBJECT AND SUMMARY OF INVENTION

It is a primary object of the present invention to provide a simply constructed ball screw capable of remarkably improving durability and a lead accuracy by preventing dead weight deflections when elongating a screw shaft.

To this end, according to one aspect of the invention, there is provided a ball screw comprising: struts each having a bearing member at its top end and disposed at adequate spacings; a screw shaft including supported parts rotatably supported on the bearings members of the struts, the screw shaft being chased, on its outer periphery, with helical ball rolling grooves a root diameter of which is substantially equal to an outside diameter of the bearing member; a nut formed, on its underside, with an opening through which the strut passes and an endless circulatory path consisting of a load region including load rolling grooves standing vis-a-vis with the helical ball rolling grooves and a non-load region for connecting both ends of the load region to permit communication with each other, the nut being greater in length in the axial direction of the load region than in the axial direction of the bearing member and moving on the screw shaft in accordance with rotations of the screw shaft; and a multiplicity of balls circulating within the endless circulatory path and undergoing loads between the load rolling grooves of the nut and the rolling grooves of the screw shaft.

Based on such technical means, if the struts have bearings, annularly fitted to the supported parts of the screw shaft, for rotatably supporting these parts, the types of the bearings and configurations of the strut bodies may be changed as the case may. The spacings at which the strut are disposed may also properly be varied to keep straightness of the screw shaft.

A length and lead of the screw shaft may adequately be changed in accordance with a necessary feeding quantity and velocity of the nut. It is, however, preferable that the rolling grooves be formed in its outer periphery to have a root diameter equal to an outside diameter of the bearing member so that the balls rolling between the load rolling grooves of the nut and the rolling grooves of the screw shaft are smoothly passable along the outer periphery of the bearing members of the struts and can effectively be prevented from coming off the load region.

A width of the opening formed in the nut may adequately be varied in accordance with a size of the strut. The number of endless trajectories may also properly be changed depending on necessary axial thrust of the nut and a structure of a slide board. Incidentally, it is required that the region formed with the load rolling grooves, i.e., the axial length of the load region be set longer than the axial length of the bearing member in order not to lose the axial thrust when the nut passes along the outer periphery of the strut bearing member in which no rolling groove is chased. The axial length of the load region is set to a value which is preferably twice or more the axial length of the bearing member.

In the thus constructed ball screw of the invention, the opening formed in the lower surface of the nut functions as a passageway for the struts when the nut moves. The axial length of the load region of the nut is set larger than the axial length of the supported part of the screw shaft, whereby the thrust is not lost even when passing through the supported parts formed with no rolling groove. As a result, the nut is movable over an entire length of the screw shaft even in such a state that the screw shaft is invariably retained by the struts, thereby obviating the problem pertaining to the dead weight deflections of the screw shaft which take place in the case of elongating the screw shaft.

According to the present invention, it is possible to obtain highly accurate motions of the nut because of assurance of the lead accuracy and hinder the radial loads from acting on the nut and the repetitive loads from acting on the ends of the screw shaft, thus ameliorating the durability thereof.

The nut is movable over the whole length of the screw shaft supported on the struts with a simple construction, which in turn facilitates the assembly and reduces the costs.

The ball screw of the invention is capable of extending the screw shaft without using any shaft coupling at the bearing members of the struts. The nut is movable through a joint of two lengths of screw shafts, and hence it is practical to design an extremely elongate ball screw.

BRIEF DESCRIPTION OF THE DRAWINGS

Other objects and advantages of the invention will become apparent during the following discussion taken in conjunction with the accompanying drawings, in which:

FIG. 6 a schematic diagram showing an example of usage of the ball screw in the first embodiment;

FIG. 7 is a schematic diagram showing a technical measure taken in the prior art in the case of elongating the screw shaft; and FIG. 8 is a schematic diagram showing an example of usage of an ordinary ball screw.

DETAILED DESCRIPTION OF THE PREFERRED EMBODIMENT

The present invention will hereinafter be described in a specific manner with reference to the accompanying drawings.

Figure 1:
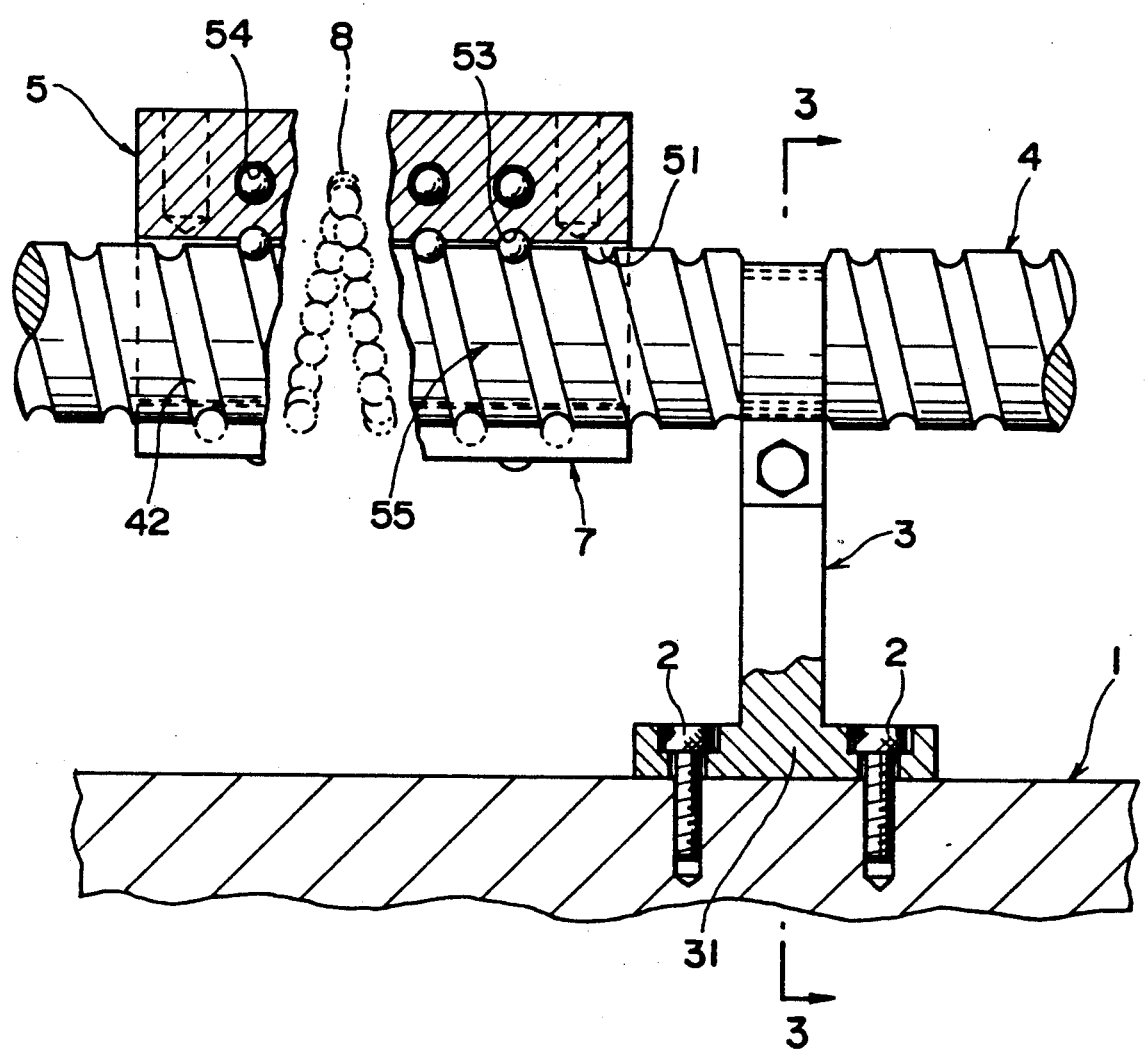
FIG. 1 is a schematic diagram illustrating a first embodiment of a ball screw of the present invention.
Figure 2:
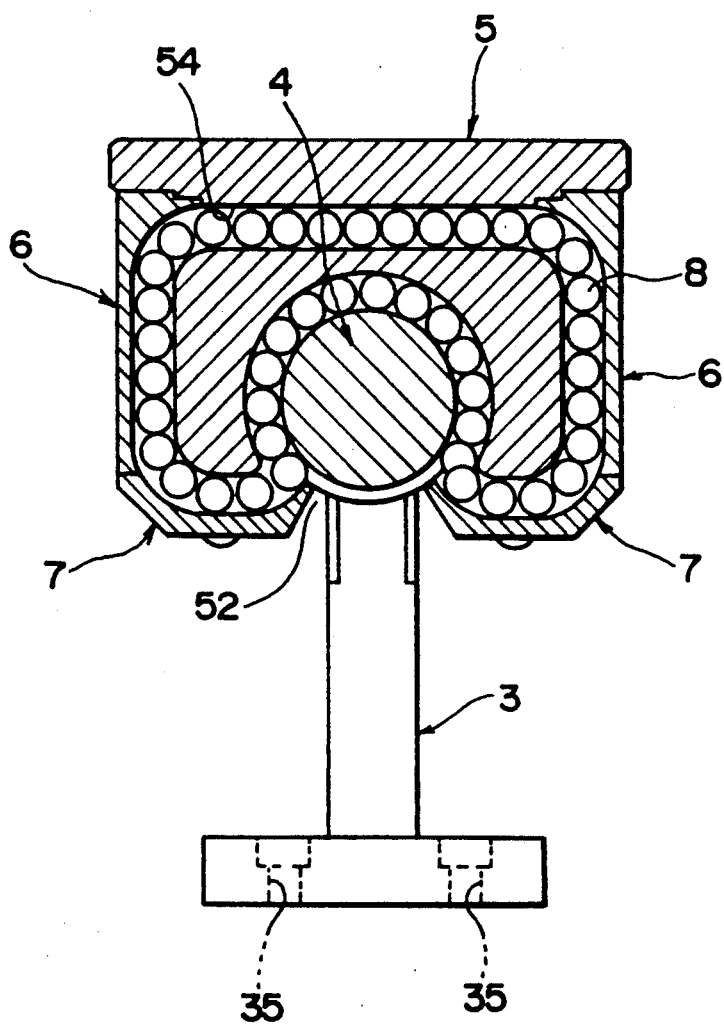
FIG. 2 is a sectional view schematically depicting the ball screw in the first embodiment.
Figure 3:
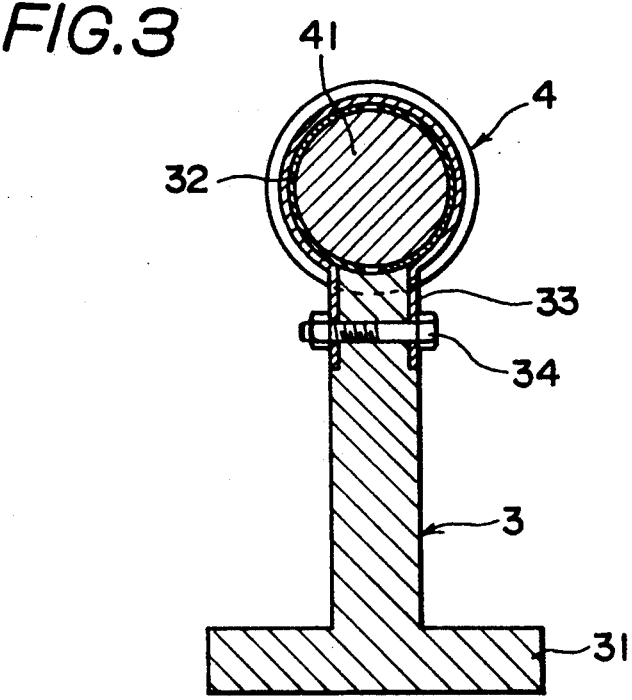
FIG. 3 is a sectional view taken substantially along the line 3—3 of FIG. 1.
Figure 4:
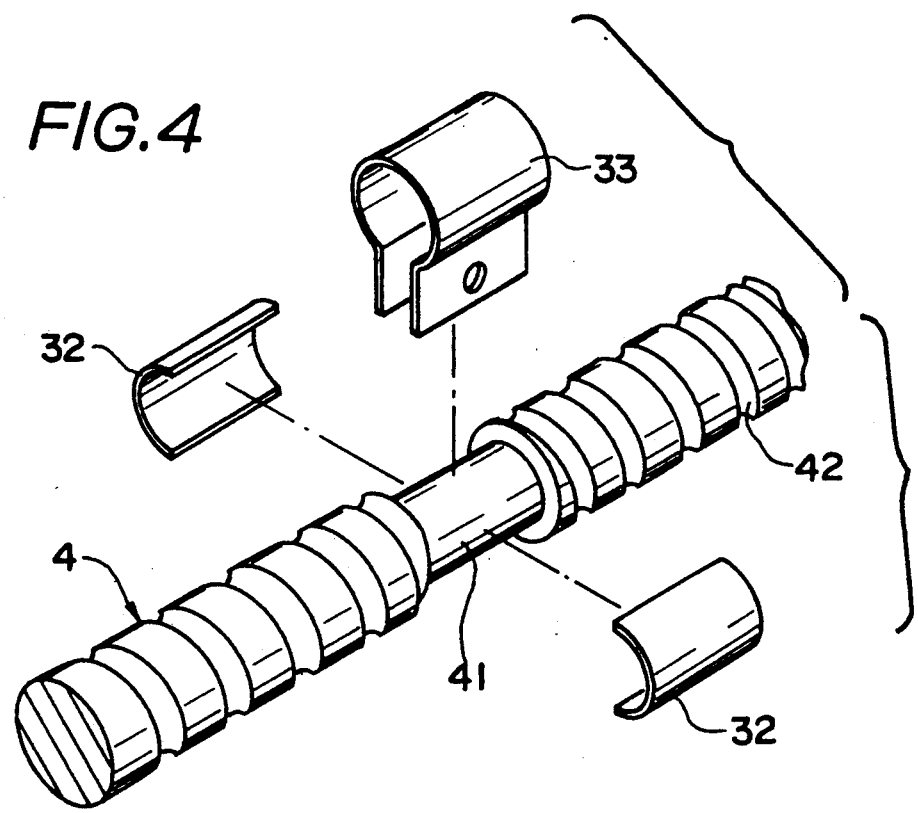
FIG. 4 is an exploded perspective view showing a state where bearing members of struts are fitted to a screw shaft.

Turning first to FIG. 1, there is illustrated a first embodiment of a ball screw of the present invention. The ball screw is composed of: struts 3 disposed at proper spacings and fixed to a mechanical device 1 with fixing means or fixing bolts 2; a screw shaft 4, rotatably supported on the struts 3, to which an arbitrary number of revolutions are imparted from a stepping motor or a servo motor; a nut body 5, fixed to a table or a moving board T, for thrusting forward the moving board T in accordance with the revolutions of the screw shaft 4; a pair of lateral plates 6 engaging with both side surfaces of the nut body 5; a pair of lower plates engaging with a lower surface of the nut body 5; and a multiplicity of balls 8 for conveying to the nut body 5 axial component forces serving as thrust forces created by the revolutions of the screw shaft 4 while circulating within the ball endless circulatory path formed in the nut body 5.

The strut 3 has, as illustrated in FIGS. 1 through 4, a head conceived as a bearing member including a slide bearing for rotatably supporting a supported part 41 of the screw shaft 4, while a bottom thereof serves as a mounting member 31 on a fixing unit 1 such as a mechanical device. The mounting member 31 is perforated with through-holes 35 admitting penetration of fixing bolts 2 with which the mounting member 31 is fastened to the fixing unit 1. The bearing member consists of a bearing metal 32 fitted bilaterally to the supported part 41 of the screw shaft 4, and a fixing plate 33 which covers an outer peripheral surface of the bearing metal 32. The screw shaft 4 is rotatably retained by the bearing metal 32 by fixing the fixing plate 33 to the strut body 3 with a fixing bolt 34.

The supported parts 41 of the screw shaft 4 each having the same length as that of the bearing metal 32 are formed at the same pitches as those at which the struts 3 are disposed. Portions other than the supported parts 41 are curvilinearly chased with helical rolling grooves 42, having a larger radius of curvature than a radius of the ball 8, for rolling the balls 8. The rolling grooves 42 are formed to have a root diameter equal to an outside diameter of the strut 3, videlicet, an outside diameter of the fixing plate 33. The rolling grooves 42 are so shaped that the balls 8 rolling along the rolling grooves 42 are able to smoothly enter the supported part 41 or separate therefrom but do not come off a load region 55 formed in the nut body 5 when passing through the supported part 41.

The nut body 5 is formed with a through-hole 51 that the screw shaft 4 penetrates and with an opening 52 through which the struts for sustaining the screw shaft 4 pass. The nut body 5 may be conceived as a rectangular block assuming a substantially C-shape in section. An inner peripheral surface of the through-hole 51 is curvilinearly chased with four streaks of load rolling grooves 53 standing vis-a-vis with the rolling grooves 42 of the screw shaft 4, the rolling grooves 53 having a greater radius of curvature than a radius of curvature of the ball 8. The load region 55 formed with the load rolling grooves 53 has an axial length which is approximately three times that of the bearing member of the strut 3, thereby preventing a sharp drop in the axial thrust forces when the nut body 5 travels along the outer peripheral surface of the bearing member chased with no rolling groove 41. Formed upwardly of the through-hole 51 in positions corresponding to the four streaks of load rolling grooves 53 is four streaks of non-load rolling slots 54 defined as one of components of the endless circulatory path in a direction orthogonal to the through-hole 51. Openings at both ends of the non-load rolling slots 54 are chamfered downwards to provide smooth circulation of the balls. Note that the reference numeral 56 denotes a mounting hole in which to fit a mounting bolt penetrating the moving board from the upper surface to the lower surface.

Figure 5:
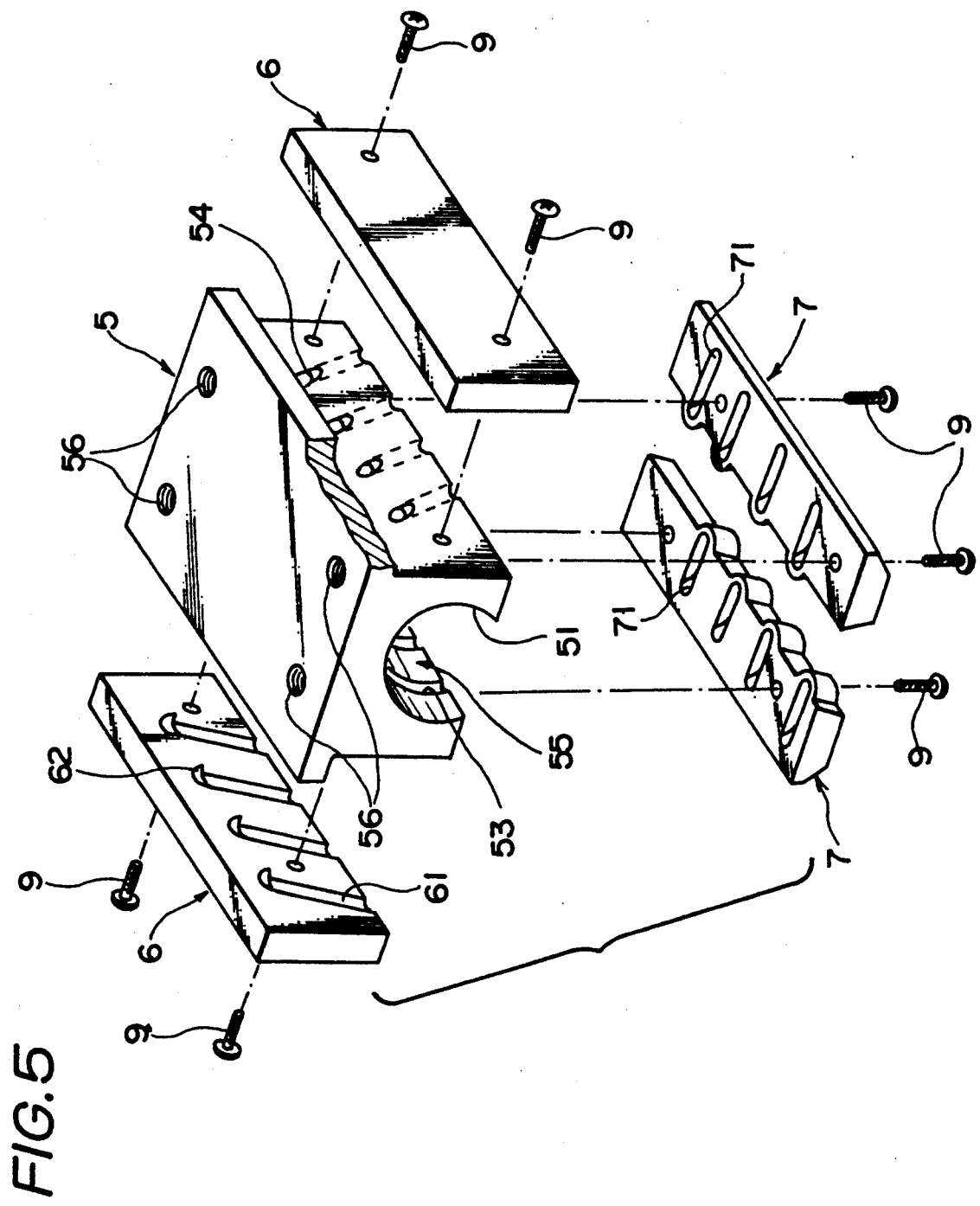
FIG. 5 is an exploded perspective view illustrating a forming configuration of a ball endless circulatory path and assembly of a nut.

Each of a pair of lateral plates 6 is, as depicted in FIG. 5, formed with four streaks of non-load rolling grooves 61 which constituting the ball endless circulatory path. Provided at an upper end of each non-load rolling groove 61 is a guide pawl 62 for causing the balls 8, disposed between the non-load rolling slots 54 and the rolling grooves 61, to smoothly come in and out. Chased in the pair of lower plates 7 are four streaks of ball whirling grooves 71 for guiding the balls 8 coming in and out of the load region of the nut body 5. The lateral plates 6 and the lower plates 7 are fastened to the nut body 5 with machine screws 9, whereby the non-load rolling grooves 61 and the ball whirling grooves 71 are combined with side and lower surfaces of the nut body 5 to constitute a part of a non-load rolling region. It is thus possible to shape the ball endless circulatory path through which both ends of the load rolling grooves 53 of the nut body 5 are connected to both ends of the non-load rolling slots 54 thereof to permit the communication with each other.

The ball screw in this embodiment having the above-described constitution is usable on the basis of the following construction. One axial end of the screw shaft 4, as illustrated in FIG. 6, is linked via a shaft coupling to a motor M. Mounted on the upper surface of the nut body 5 is a moving board T held and guided by another rectilinear guide mechanism. The rotations corresponding to an amount of rectilinear movements of the moving board T are imparted to the screw shaft 4 by means of the motor, whereby the nut body 5 is thrust forward along the screw shaft 4 to impart a predetermined amount of movements to the moving board T.

In this case, the number of the struts 3 disposed may adequately be determined in accordance with a necessary length of the screw shaft 4, and the nut body 5 is movable over the entire length of the screw shaft 4 irrespective of the placement of the struts 3, depending on a structure of the nut body 5.

The ball screw in this embodiment is capable of hindering occurrence of lead errors caused by the deflections of the screw shaft 4 and the radial loads from acting on the nut body 5, obtaining nut motions with a high accuracy and also improving the durability thereof.

Although the illustrative embodiment of the present invention has been described in detail with reference to the accompanying drawings, it is to be understood that the invention is not limited to this precise embodiment. Various changes or modifications may be effected therein by one skilled in the art without departing from the scope or spirit of the invention.

What is claimed is:

1. A ball screw comprising:
   struts provided with bearing members at their top ends and disposed at proper spacings;
   a screw shaft including supported parts rotatably supported on said bearing members of said struts, said screw shaft being chased, on its outer periphery, with helical ball rolling grooves a root diameter of which is substantially equal to an outside diameter of said bearing member; a nut formed, on its underside, with an opening through which said struts pass and an endless circulatory path consisting of a load region including load rolling grooves standing vis-a-vis with said helical rolling grooves and a non-load region for connecting both ends of said load region to permit communication with each other, said nut being greater in length in the axial direction of said load region than in the axial direction of said bearing member and moving on said screw shaft in accordance with rotations of said screw shaft, said nut including;
   a nut body having a through-hole for the passage of said screw shaft therethrough with an inner peripheral surface curvilinearly chased with said load rolling grooves therein standing vis-a-vis with said ball rolling grooves on said screw shaft, non-load rolling slots each defining one component of said non-load region for connecting said both ends of said load region and formed in positions corresponding to said load rolling grooves and defining one component of each said endless circulatory path in a direction orthogonal to said through-hole;
   a pair of lateral plates fastened, respectively, to opposite sides of said nut parallel to the axis of said through hole, said lateral side plates each having non-load roller grooves;
   a pair of lower plates each fastened, respectively, to said underside of said nut at opposite sides of said opening in said nut through which said struts pass, each of said lower plates having roller grooves therein, each aligned, at its opposite ends, with said roller grooves in said nut body and said lateral side plates, respectively; and
   a multiplicity of balls circulating within said endless circulatory path and undergoing loads between said load rolling grooves of said nut and said rolling grooves of said screw shaft.

2. A ball screw, as recited in claim 1, in which said load rolling grooves in said nut form a load region have an axial length approximately three times the length of the load region of said bearing member of each of said struts.

* * * * *